United States Patent [19]
Chiu

[11] Patent Number: 6,048,061
[45] Date of Patent: Apr. 11, 2000

[54] FOLDABLE EYEGLASSES

[76] Inventor: Lien Fa Chiu, No. 6-36, Ta Liao, Yung An Village, Pu Tai Town, Chiayi Hsien, Taiwan

[21] Appl. No.: 09/103,974

[22] Filed: Jun. 24, 1998

[51] Int. Cl.[7] .................................................. G02C 5/08
[52] U.S. Cl. .............................................. 351/63; 351/41
[58] Field of Search ................................. 351/63, 111, 41

[56] References Cited

U.S. PATENT DOCUMENTS 4,887,895  12/1989  Tseng ........................................ 351/63
5,028,126   7/1991  Takeuchi .................................... 351/63

*Primary Examiner*—Huy Mai
*Attorney, Agent, or Firm*—Charles E Baxley, Esq.

[57] ABSTRACT

A pair of eyeglasses includes two frames each holding a lens. Each frame includes an outer end to which a connecting member is securely attached. A chain includes two ends respectively attached to the connecting members. One of the frames includes an inner end pivotally connected to the other frame magnetic closure is provided for the connecting members.

3 Claims, 3 Drawing Sheets

FOLDABLE EYEGLASSES

BACKGROUND OF THE INVENTION

1. Field of the Invention

The present invention relates to a pair of foldable eyeglasses that can be used as a necklace when folded.

2. Description of the Related Art

A pair of eyeglasses can usually be folded along hinged portions between their templates and main frame. Nevertheless, the pair of folded eyeglasses still occupies a relatively large space, which is inconvenient to their user in carriage. In addition, the folded pair of eyeglasses might be damaged inadvertently when put in a pocket, e.g., it might fall from the pocket or be crushed by an external impact. Further, the folded pair of eyeglasses may cause a bulge of the pocket and thus adversely affect appearance of the user. The present invention is intended to provide an improved design to solve these problems.

SUMMARY OF THE INVENTION

It is a primary object of the present invention to provide a pair of eyeglasses, which can be folded to a relatively small volume and can be used as a necklace when folded.

A pair of eyeglasses in accordance with the present invention comprises a first frame including a first groove defined in a side thereof, a second frame including a second groove defined in a side thereof, a first lens held by the first groove of the first frame, a second lens held by the second groove of the second frame, a first connecting member securely attached to an outer end of the first frame, a second connecting member securely attached to an outer end of the second frame, a first pivotal member securely attached to an inner end of the first frame, a second pivotal member securely attached to the inner end of the second frame and pivotally connected with the first pivotal member to allow pivotal movements between the first frame and the second frame along a common longitudinal direction of the first frame and the second frame, and a chain having a first end securely attached to the first connecting member and a second end securely attached to the second connecting member.

Each of the first connecting member and the second connecting member includes a magnet attached thereto for releasably engaging with each other when the pair of eyeglasses is folded to a completely folded status. Each of the first lens and the second lens may include a portion respectively held by the first connecting member and the second connecting member. Each of the first pivotal member and the second pivotal member may optically include an extension for respectively holding the first lens and the second lens.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
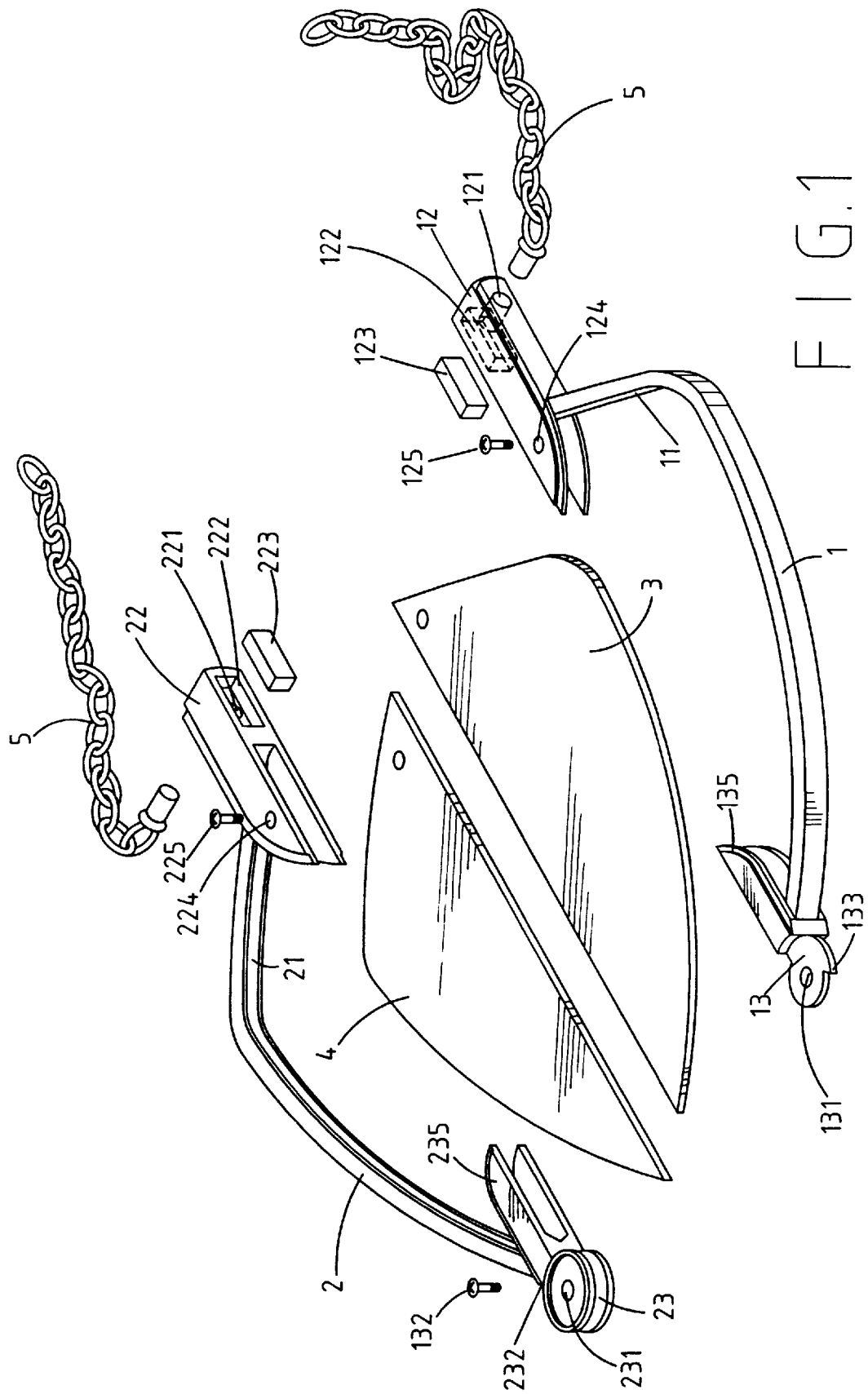
FIG. 1 is an exploded perspective view of a pair of eyeglasses in accordance with the present invention.

Referring to the drawings and initially to FIG. 1, a pair of eyeglasses in accordance with the present invention generally includes two frames 1 and 2, two lenses 3 and 4, and a chain 5. Each frame 1, 2 includes a groove 11, 21 defined in an inner side thereof for holding an associated lens 3, 4. Each frame 1, 2 further includes an outer end to which a connecting member 12, 22 is securely attached. Further, each frame 1, 2 includes an inner end to which a pivotal member 13, 23 is attached securely. Each connecting member 12, 22 includes a hole 121, 221, for receiving an associated end of the chain 5. Each connecting member 12, 22 further includes a receptacle 122, 222 for receiving a magnet 123, 223 therein to provide a releasable engagement between the connecting members 12 and 22. Nevertheless, other releasably engaging means can be used. Each connecting member 12, 22 further includes a connecting hole 124, 224, and the associated lens 3, 4 includes a hole (not labeled) defined in an end thereof such that a pin or screw 125, 225 is extended through the connecting hole 124, 224 and the hole of the associated lens 3, 4 to securely retain the lens 3, 4 in position.

Figure 4:
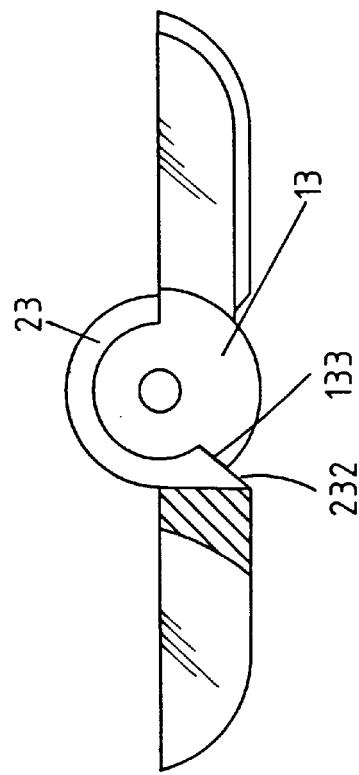
FIG. 4 is an enlarged front elevational view, partly sectioned, illustrating a pivotal connection provided in a middle part of the pair of eyeglasses.

The pivotal member 13 includes a hole 131 defined therein, while the pivotal member 23 includes two spaced lugs 231 with aligned holes 232. The spaced lugs 231 receive the pivotal member 13, and a pin or screw 132 is extended through the holes 232 and 131 to provide a pivotal connection therebetween (FIG. 4). Each pivotal member 13 and 23 may include an extension 135, 235 for holding a portion of the associated lens 3, 4.

Figure 2:
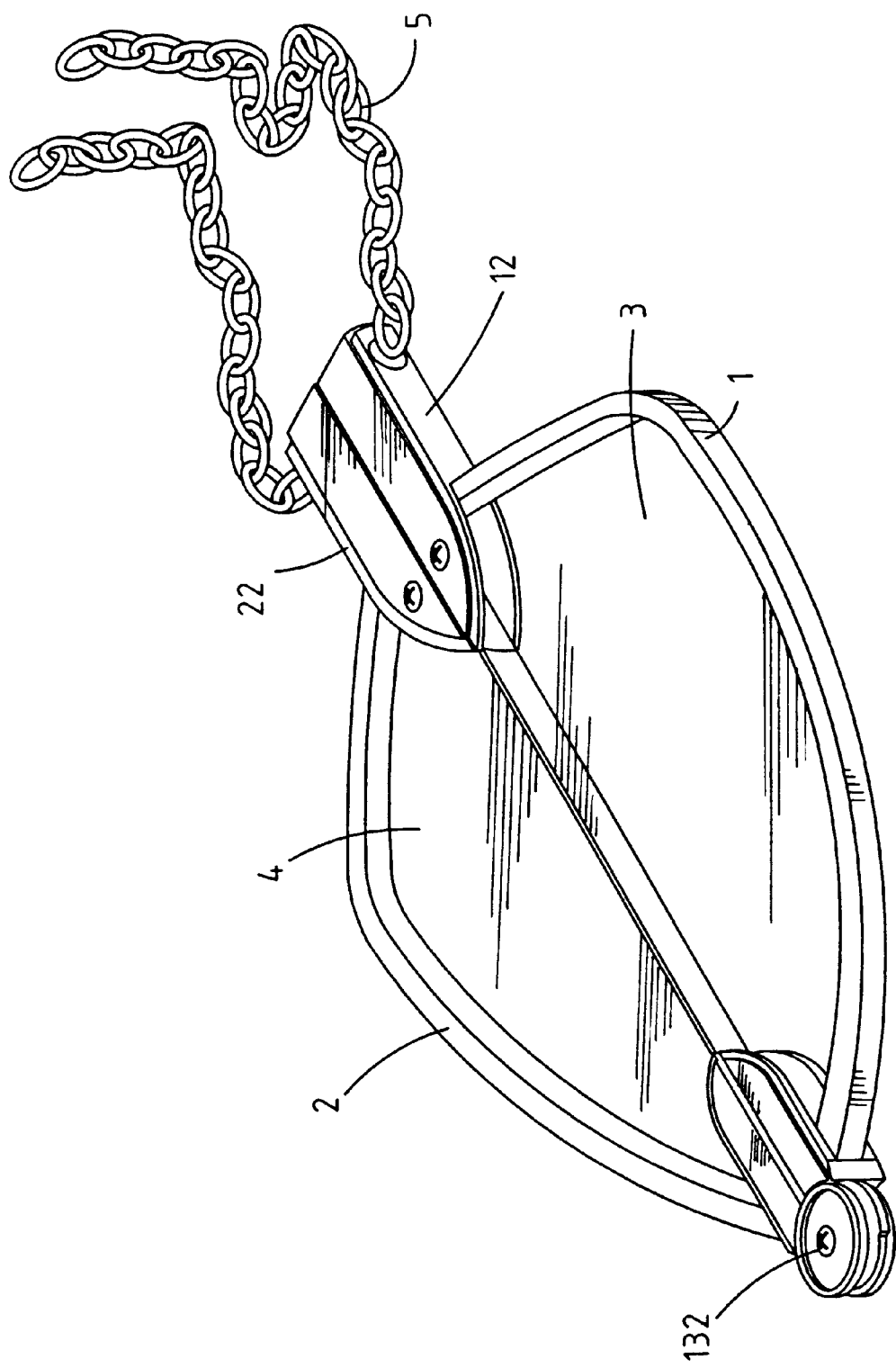
FIG. 2 is a perspective view of the pair of eyeglasses in a completely folded status.
Figure 3:
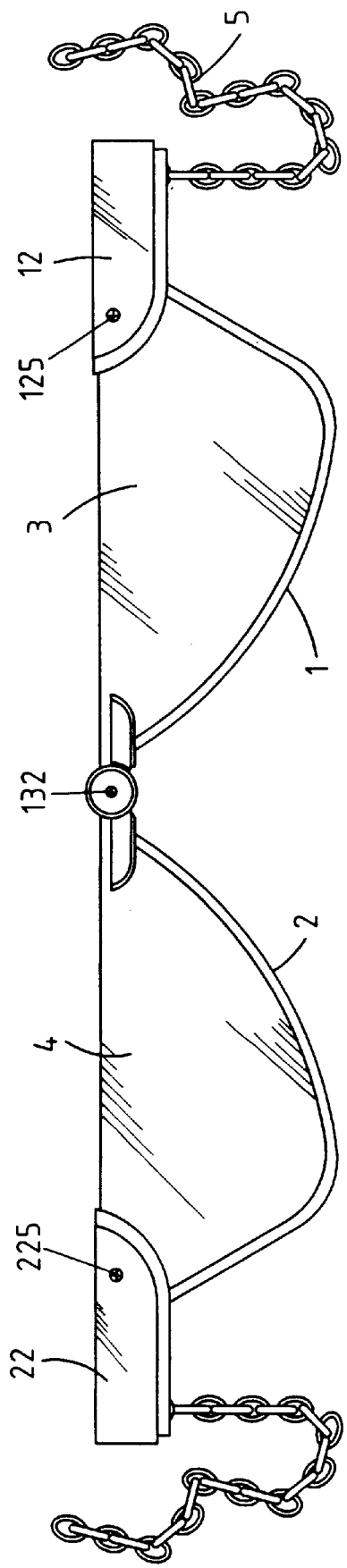
FIG. 3 is a front elevational view of the pair of eyeglasses in an extended status.

When not in use, the pair of eyeglasses may be folded along a longitudinal direction to the completely folded status shown in FIG. 2. The magnets 123 and 224 attract each other and thus provide an engaging effect. The folded pair of glasses may be used as a necklace and thus does not cause a problem in carriage. In use, the user may pivot the pair of eyeglasses about the pin 132 to the extended status shown in FIG. 3. It is appreciated that the pivotal member 13 may include a stop 133 (FIG. 1) to prevent from excessive pivotal movements of the pair of eyeglasses. Namely, the pair of eyeglasses can be at most extended to the status shown in FIG. 3.

According to the above description, it is appreciated that the pair of eyeglasses of the present invention can be folded to a relatively compact volume and can be used as a necklace.

Although the invention has been explained in relation to its preferred embodiment, it is to be understood that many other possible modifications and variations can be made without departing from a spirit and scope of the invention as hereinafter claimed.

What is claimed is:

1. A pair of eyeglasses, comprising:

a first frame including an inner end and an outer end, the first frame further including a first groove defined in a side thereof, a second frame including an inner end which faces the inner end of the first frame and an outer end, the second frame including a second groove defined in a side thereof, a first lens held by the first groove of the first frame, a second lens held by the second groove of the second frame, a first connecting member securely attached to the outer end of the first frame, a second connecting member securely attached to the outer end of the second frame, a first pivotal member securely attached to the inner end of the first frame, a second pivotal member securely attached to the inner end of the second frame and pivotally connected with the first pivotal member to allow pivotal movements between the first frame and the second frame along a common longitudinal direction of the first frame and the second frame, a chain having a first end securely attached to the first connecting member and a second end surely attached to the second connecting member, and each of the first connecting member and the second connecting member includes a magnet attached thereto for releasably engaging with each other when the pair of eyeglasses is folded to a closed status.

2. The pair of eyeglasses as claimed in claim 1, wherein each of the first lens and the second lens includes a portion respectively held by the first connecting member and the second connecting member.

3. The pair of eyeglasses as claimed in claim 1, wherein each of the first pivotal member and the second pivotal member includes an extension for respectively holding the first lens and the second lens.

\* \* \* \* \*